United States Patent [19]
Kilbourn

[11] 3,896,134
[45] July 22, 1975

[54] 3-PYRIDYLMETHYL CARBAMATE RODENTICIDES

[75] Inventor: Edward E. Kilbourn, Chalfont, Pa.

[73] Assignee: Rohm and Haas Company, Philadelphia, Pa.

[22] Filed: Apr. 1, 1974

[21] Appl. No.: 456,933

Related U.S. Application Data

[62] Division of Ser. No. 352,854, April 18, 1973, Pat. No. 3,835,147.

[52] U.S. Cl...... 260/295.5 C; 260/295.5 B; 424/263
[51] Int. Cl.² ........................................ C07D 213/75
[58] Field of Search ............................ 260/295.5 C

[56] References Cited
OTHER PUBLICATIONS

Billiotte et al., Chem. Abstracts, Vol. 65, No. 2, 2213e–h; May 16, 1966.
Debay et al., Chem. Abstracts, Vol. 67, 64, 245z, Sept. 25, 1967.

*Primary Examiner*—Alan L. Rotman
*Attorney, Agent, or Firm*—William E. Lambert, III

[57] ABSTRACT

Novel 3-pyridylmethyl N-heterocyclic-carbamates. They are useful rodenticides.

1 Claim, No Drawings

3-PYRIDYLMETHYL CARBAMATE RODENTICIDES

This application is a divisional of U.S. Ser. No. 352,854 filed Apr. 18, 1973, now U.S. Pat. No. 3,835,147 dated Sept. 10, 1974.

The present invention is concerned with novel compounds which belong to the class of 3-pyridylmethyl N-heterocyclic-carbamates. They conform to the structure

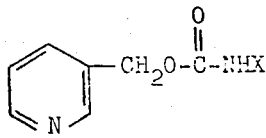

wherein X is the radical

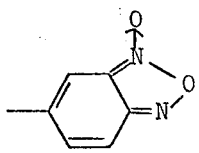 or 4-pyridyl.

The compound

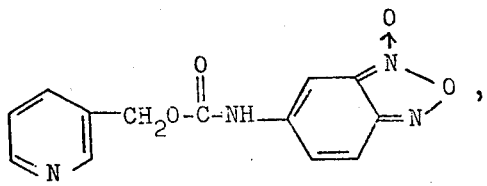

which may be named 3-pyridylmethyl 5-benzofurazanylcarbamate-1-oxide, is a member of the class of compounds known as benzofuroxans. It specifically is a derivative of 5-aminobenzofuroxan. The chemistry of related compounds is discussed in J. Chem. Soc. (C) 1966, 971.

The compound of the structure

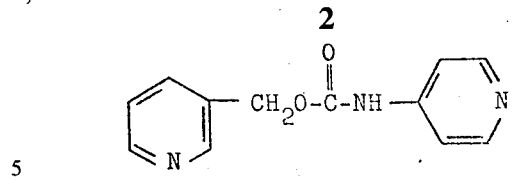

is known as 3-pyridylmethyl N-(4-pyridyl)carbamate. Related 3-pyridylmethyl carbamates have been studied by Russian workers such as Novokov, et al., e.g. see Chem. Abstracts 70, 77728w (1969). British Pat. No. 1,071,035 also discloses related carbamates.

The following gives the method of preparation for the compounds of this invention.

EXAMPLE 1

Preparation of 3-pyridylmethyl 5-benzofurazanylcarbamate-1-oxide 3,4-Dinitrobenzoyl chloride (8.65 g., 0.04 mol), prepared from 3,4-dinitrobenzoic acid by treatment with thionyl chloride, was dissolved in 75 ml of acetone and was added dropwise to a solution of sodium azide (3.25 g., 0.05 mol) in acetone (15 ml) and water (15 ml) at a temperature maintained in the range of −5° to 0°C. The resultant suspension was stirred at 0°C. for 1 hour; then water (150 ml) and toluene (100 ml) were added. The toluene layer was isolated after shaking in a separatory funnel and was dried over anhydrous magnesium sulfate. 3-Pyridyl carbinol (7.25 g., 0.067 mol) was added to the dried, filtered toluene solution. After refluxing for 5 hours, the solution was let stand overnight at room temperature. A suspension resulted and was filtered to give 2.5 g. of a crystalline solid melting with decomposition at 183°–184°C. Recrystallization from ethanol gave a solid melting with decomposition at 192°C. The product was found by analysis to contain 54.4%C., 3.5%H and 19.9%N; calculated for $C_{13}H_{10}N_4O_4$ is 54.6%C, 3.5%H and 19.6%N.

The reaction may be written

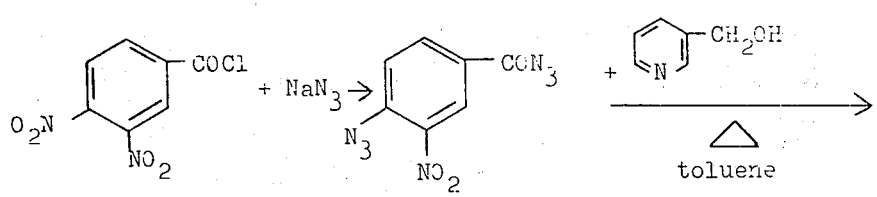

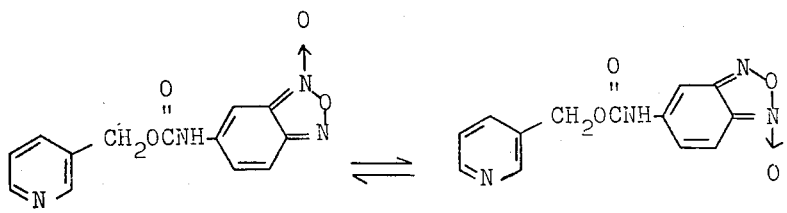

The benzofuroxan structure was confirmed by the nmr spectrum. For convenience, the compound is named as having the 1-oxide structure, whereas, according to the literature on benzofuroxans, it very likely is in equilibrium as indicated above.

EXAMPLE 2

Preparation of 3-pyridylmethyl N-(4-pyridyl)carbamate

The acid chloride of isonicotinic acid (5.5 g., 0.04 mol), prepared via thionyl chloride, was dissolved in 75 ml of acetone and was added over a 30 minute period to a solution of sodium azide (3.3 g., 0.05 mol) in water (15 ml) and acetone (15 ml) while maintaining the temperature in a range of −5° to 0°C. The suspension that formed was stirred at 0°C. for 2 hours after which was added water (100 ml) and toluene (200 ml). The toluene layer was dried with anhydrous magnesium sulfate, filtered, and 3-pyridyl carbinol (7.25 g., 0.07 mol) was added to the filtrate. This solution was refluxed for 18 hours, cooled and the suspension was filtered to obtain 0.3 g. of solid melting at 165°–168°C. after recrystallization from toluene. The filtrate of the toluene recrystallization step was poured into excess hexane. A second crop was isolated which after recrystallization from toluene amounted to 1.3 g. melting at 164.5°–167.5°C. The product was found by analysis to contain 62.2%C, 4.8%H and 18.3%N; calculated for $C_{12}H_{11}N_3O_2$ is 62.9%C, 4.8%H and 18.3%N. The reaction may be depicted as

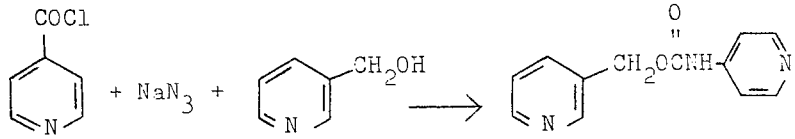

The compounds of the present invention are useful as rodenticides. They may be formulated into rodenticidal compositions such as baits, tracking powders and sprays. The compound is effective as a one-dose rodenticide and depending on the susceptibility of the rodents to the toxicant and the amount of formulated bait generally consumed, the concentrations can be from as low as 0.05% to almost 100%. A typical bait may contain between 0.5% and 2.5% of the toxicant by weight.

The compounds were preliminarily evaluated for their ability to kill albino rats (*Rattus norvegicus*) by oral administration to two rats at a dosage of 50 mg./kg. The effect on the rats was observed 14 days later. If at least one of the rats had died, the compound was then subjected to a secondary test.

One of the most significant secondary tests is a standard one known as the paired-preference test. In this test the rodents are given a free choice between the treated and untreated bait. Such a test most nearly approximates practical use conditions.

A basal ration was prepared by blending 65 parts of crude ground corn, 25 parts of steel cut oats, 5 parts of powdered sugar and 5 parts of corn oil. The compound was then incorporated into the basal ration in an amount determined by the percentage of active ingredient desired in the bait.

The rodents were caged individually, and were provided with dual feed cups and separate water devices. The basal ration was offered in excess of daily feed requirements in each of two feeders: one treated with the test compound and one without. For each test, equal numbers of each sex were used.

The gross weight of each feed container and its feed were determined daily and returned to the starting weight by addition of complete replacement of the given diet. The position of the bait and the laboratory diet cups in the cage were reversed every 24 hours to counter any feeding position habit of the rat. The test rodents had free choice between treated and untreated feed for 72 hours. Mortalities were recorded daily but are reported for an 8 day test period.

Table I gives the results of these tests with the compounds of the present invention.

Table I

| | Rodenticidal Activity on Albino Rats | | |
|---|---|---|---|
| | Acute Oral Test at 50 mg./kg. | Paired-preference Test | |
| Example | No. killed/ No. tested | Drug level (%) | No. killed/ No. tested |
| 1 | 2/2 | 0.3 | 2/2 |
| 2 | 2/2 | 1 | 0/2 |

In a test similar to the paired-preference test using roof rats (*Rattus rattus*), Example 1 at the 1% level killed one rat out of four.

In an evaluation on the albino mouse, *Mus musculus*, involving oral administration on three successive days at a dosage of 200mg./kg., the compound of Example 1 killed three out of four mice.

I claim:
1. The compound 3-pyridylmethyl N-(4-pyridyl)-carbamate.

* * * * *